United States Patent
Ding et al.

(10) Patent No.: US 7,164,928 B2
(45) Date of Patent: Jan. 16, 2007

(54) METHOD FOR MANAGING CONCATENATED ENHANCED SHORT MESSAGE AND TELECOMMUNICATION TERMINAL USING THE METHOD

(75) Inventors: Dayu Ding, Shang Hai (CN); Danbin Fu, Shang Hai (CN); Stëphane Augui, Paris (FR); Marc Tricoche, Paris (FR)

(73) Assignee: TCL Communication Technology Holdings Ltd., Hong Kong (HK)

( * ) Notice: Subject to any disclaimer, the term of this patent is extended or adjusted under 35 U.S.C. 154(b) by 46 days.

(21) Appl. No.: 10/491,571

(22) PCT Filed: Nov. 8, 2001

(86) PCT No.: PCT/EP01/14207

§ 371 (c)(1),
(2), (4) Date: Apr. 5, 2004

(87) PCT Pub. No.: WO03/041025

PCT Pub. Date: May 15, 2003

(65) Prior Publication Data

US 2004/0248598 A1 Dec. 9, 2004

(51) Int. Cl.
*H04Q 7/20* (2006.01)
*H04Q 7/22* (2006.01)
*H04M 1/663* (2006.01)

(52) U.S. Cl. ............... 455/466; 455/412.1; 455/412.2

(58) Field of Classification Search .......... 455/89, 455/33.1, 45.1, 90, 466, 412.1, 412.2, 553, 455/410, 418, 419, 420, 556, 557, 38.1, 186.1, 455/4.2, 6.3, 5.1, 6.2, 569, 433, 414.1, 45.2, 455/90.1, 553.1, 566; 370/349, 338, 346, 370/522, 535, 463, 328, 7.1–7.2, 7.28, 7.46, 370/7.52, 7.53, 7.21, 7.22
See application file for complete search history.

(56) References Cited

U.S. PATENT DOCUMENTS

| | | | |
|---|---|---|---|
| 5,241,305 A * | 8/1993 | Fascenda et al. .......... 340/7.41 |
| 5,426,422 A | 6/1995 | Vanden Heuvel |
| 6,480,712 B1 * | 11/2002 | Vigil ....................... 455/412.2 |
| 6,640,242 B1 * | 10/2003 | O'Neal et al. .............. 709/206 |
| 6,757,732 B1 * | 6/2004 | Sollee et al. ................ 709/227 |
| 6,865,385 B1 * | 3/2005 | Kohda et al. ............ 455/414.1 |
| 6,920,507 B1 * | 7/2005 | Kley et al. .................. 709/248 |
| 2002/0128036 A1 * | 9/2002 | Yach et al. ................. 455/552 |

(Continued)

OTHER PUBLICATIONS

3GPP: "Technical realization of the Short Message Service (SMS) 3G TS23.040 version 3.5 Release 1999", ETSI XP002202093.

*Primary Examiner*—Naghmeh Mehrpour
(74) *Attorney, Agent, or Firm*—Morgan, Lewis & Bockius LLP

(57) ABSTRACT

A method for managing a concatenated Enhanced Short Message comprises the steps of creating a status variable representing the READ/UNREAD status of a page; assigning the status variable to each page received by the telecommunication terminal; initiating the assigned status variable into UNREAD; and updating the status variables of all received pages in the message into READ after any one of the received pages of the messages has been read, and updating the status variables of all the previously received pages of the message into UNREAD when a posterior page of the message is received.

22 Claims, 5 Drawing Sheets

U.S. PATENT DOCUMENTS

2003/0036694 A1* 2/2003 Liu .......................... 600/413
2003/0105825 A1* 6/2003 Kring et al. ............... 709/206
2005/0215272 A1* 9/2005 Helferich .................. 455/512

* cited by examiner

METHOD FOR MANAGING CONCATENATED ENHANCED SHORT MESSAGE AND TELECOMMUNICATION TERMINAL USING THE METHOD

FIELD OF THE INVENTION

This invention relates to a method for managing a short message at a telecommunication terminal, and in particular, to a method for managing a concatenated Enhanced Short Message at a telecommunication terminal such as a mobile phone. The invention further relates to a telecommunication terminal using the method.

TECHNICAL BACKGROUND

Short Message Service (SMS) is warmly welcome by users of mobile phones. An advantage of SMS over the conventional Call Service is that a sender may much less worry about receipt of a message. Even if a receiving terminal is turn-off or in a place having weak signals, the message will be finally received when the user turns on his mobile phone or goes into a place having strong signals. However, in regard to the conventional Call Service, most users had such an experience that a calling signal can not be received or the speech quality is degraded if the intensity of signals is low in situ. In this situation, the receiver will not obtain the information unless a communication connection is re-established between the pair in the places having strong signals. It further goes without saying that no calls will be received when a receiving terminal is turn-off. Another advantage of SMS is its low service fee.

At the early stage of the development of SMS, a short message only comprises text content without any multimedia information, such as melodies and pictures, so that the message contains a small amount of information and thus can be consisted of one transport protocol data unit (TPDU). SMS protocol supports the transmission of such a short message. Recently, Enhanced Short Message Service (EMS) is introduced in the recommendation of mobile SMS 3GPP TS 23.040. An EMS possibly contains a lot of information and requires more than one TPDU. The present protocol also supports the transmission of an EMS in network by concatenating several TPDUs.

However, the present protocol does not guarantee that the concatenated TPDUs arrive at a terminal in order. Not only the TPDUs from one EMS may arrive at the terminal in disorder, but also the TPDUs from different EMSs may arrive interleavingly. For example, two EMSs are sent to a terminal. One is consisted of 4 concatenated TPDUs in the order of m1, m2, m3 and m4, and the other is consisted of 5 concatenated TPDUs in the order of M1, M2, M3, M4 and M5. As the protocol does not support the arrival of the TPDUs in order, they may arrive at the terminal in the following order of m4, m1, M3, m2, M5, M2 . . .

As EMSs may arrive at a terminal in disorder, several problems issue and need to be solved. The first problem is when the user is notified of arrival of an EMS. One simplified contemplation is to notify the user when all the TPDUs arrive. As is well known, one or more TPDUs of an EMS could be lost in the period of transmission. Therefore, in this contemplation, if one of the TPDUs never arrives, a man-machine interface (MMI) will not be connected with a application layer of an open system so that the user will neither be notified of arrival of an EMS nor be able to lookup any content of the EMS. Another consideration is to notify the user of arrival each time when one TPDU arrives. However, sometime, this method will burden the terminal and disturb the user too much.

Another design is contemplated by notifying the user of arrival of an EMS and displaying its content on a screen when all the TPDUs arrives in correct order, and displaying incorrect content (for example, displaying in disorder) on the screen when the EMS arrives in disorder or at least one TPDU is lost. Although, the third design still notifies the user of arrival of an EMS even if one TPDU never arrives, the EMS is simply displayed by incorrect content on the screen. It is neither friendly to the users nor reasonable to the user interface.

Therefore, another problem arises, i.e. how to recognize and display individual TPDUs which arrive at the terminal in disorder?

Still another problem is how to present a "broken" EMS. Here, the term "broken" means that the EMS is not completed with one or more TPDUs missing.

Therefore, there exists a need to provide a improved method for managing a concatenated Enhanced Short Message at a telecommunication terminal in order to notify the user of arrival of the message at proper time and display the content of the received EMS reasonably and friendly.

Accordingly, an object of the invention is to provide a method for managing a concatenated Enhanced Short Message at a telecommunication terminal.

Another object of the invention is to provide a method for notifying an user of arrival of an EMS.

Still another object of the invention is to provide a method for displaying an EMS in user friendly way.

Further another object of the invention is to provide a telecommunication terminal using the inventive method for managing a concatenated Enhanced Short Message.

SUMMARY OF THE INVENTION

The present invention provides a method for managing a concatenated Enhanced Short Message sent by a telecommunication network to a telecommunication terminal, in which the message comprises at least one page. The method comprises the steps of:

a) creating a status variable representing the READ/UNREAD status of a page;

b) assigning said status variable to each page received by the telecommunication terminal;

c) initiating said assigned status variable into UNREAD; and d) updating the status variables of all received pages in the message into READ after any one of the received pages of the messages has been read, and updating the status variables of all the previously received pages of the message into UNREAD when a posterior page of the message is received.

In the above method, the message may have one or more pages. When the message comprises at least two pages, each page comprises fields for representing the total number of the EMS pages and its page number. A predetermined icon is set into a prompt state each time a page is received. In this case, the method may further comprise the steps of activating a user menu; selecting an entry of short messages from the user menu and displaying on the screen two items of UNREAD group and READ group, the UNREAD group including messages having their pages in UNREAD statuses and the READ group including messages having their pages in READ statuses; designating the UNREAD group and listing the messages in the UNREAD group on the screen; designating a desired message and displaying its content on the screen; updating the status variables of all the pages of the message into READ; and setting said predetermined icon into a counter-prompt state. The method of the invention may also select a desired message from the READ group and display its content on the screen at any time.

When the last page of the message is received, alerting is provided and a screen is popped to inform arrival of the message. At this time, the method may further comprises the steps of displaying the content of the message on the screen when a displaying instruction is received; and updating the status variables of all the received pages of the message into READ.

In the above invention, the step of listing the messages in the UNREAD or READ group may comprise the step of listing the UNREAD or READ messages in an increasing or decreasing order according to their respective time parameters. The step of displaying the content of the message may comprise the step of displaying the content of the message in an increasing order of the page numbers. Preferably, a predetermined symbol or string is used to replace a missing page.

The method of the invention may further comprise the step of requesting a recipient work to send a status report for the last page to a message originating terminal indicating that the message has been properly received.

The present invention further provides a telecommunication terminal using the above managing method. In addition to means for inputting instructions, means for receiving a page, means for storing the received page, and means for informing the user of arrival of the page, the telecommunication terminal further comprises: means for creating a status variable representing the READ/UNREAD status of a page; means for assigning said status variable to each page received by the telecommunication terminal; means for initiating said status variable into UNREAD; and means for updating the status variables of all received pages in the message into READ after any one of the received pages of the messages has been read and updating the status variables of all the previously received pages of the message into UNREAD when a posterior page of the message is received.

The above-mentioned telecommunication terminal may be a mobile phone and the storing means may be a SIM card. Furthermore, the telecommunication terminal may further comprise means for requesting a recipient work to send a status report for the last page to a message-originating terminal indicating that the message has been properly delivered.

BRIEF DESCRIPTION OF THE INVENTION

DETAILED DESCRIPTION OF THE PREFERRED EMBODIMENTS

Reference will now be made in detail to the present preferred embodiments of the invention, examples of which are illustrated in the accompanying drawing. Wherever possible, the same reference numbers will be used throughout the drawings to refer to the same or like parts.

A typical mobile phone is shown in FIG. 1. The mobile phone 10 includes a keypad 1 and a screen 2. The keypad 1 comprises numeric keys 0–9 and functional keys. The screen 2 is used to display information such as prompt icons, notifications, and short messages.

Figure 2:
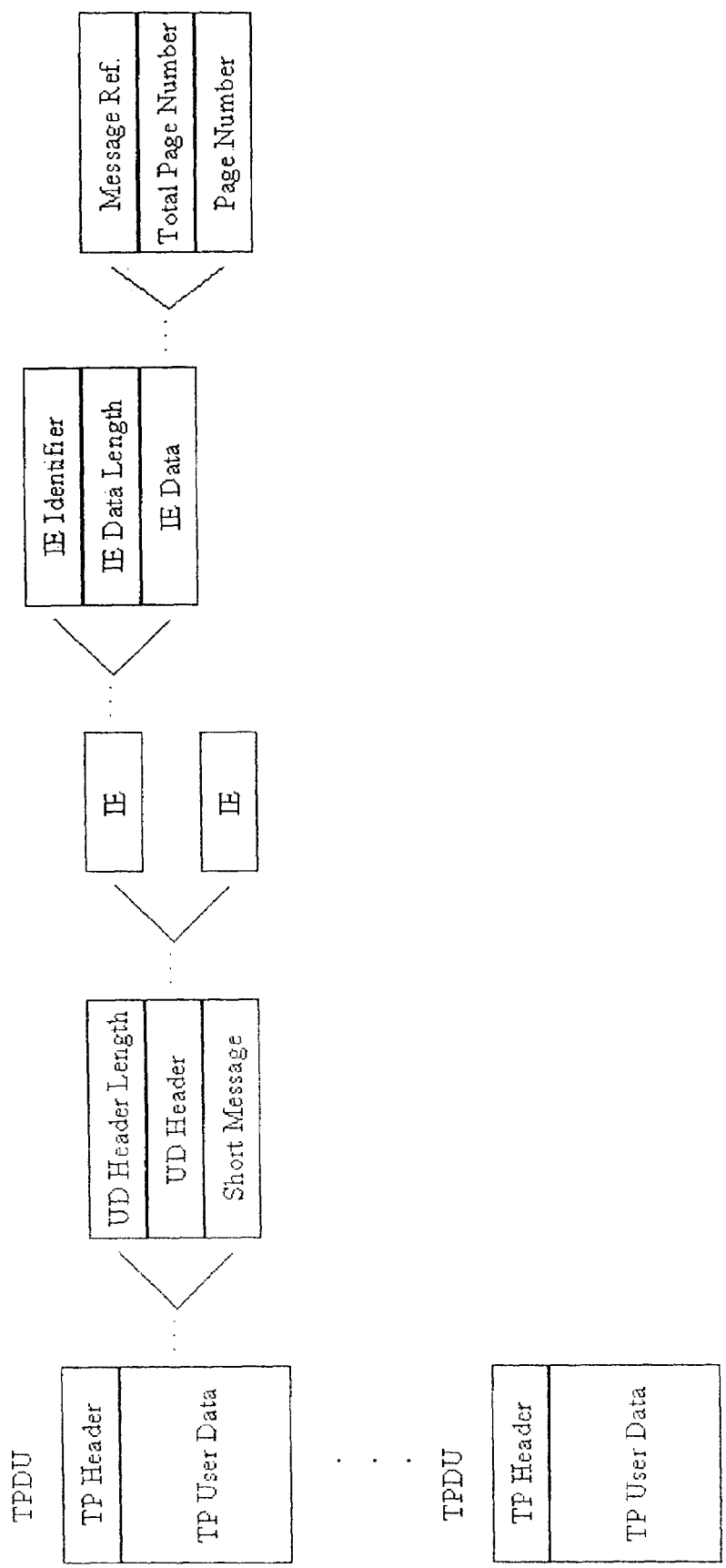
FIG. 2 is a schematic diagram of a data structure of an EMS.

FIG. 2 is a schematic diagram of a data structure of an EMS. One EMS is generally consisted of several concatenated TPDUs, each of which comprise TP Header and TP User Data. TP Header comprises information of transmission such as a telephone number, a service center time stamp (hereinafter denoted as TP_SCTS) which represents the time when the corresponding TPDU arrives at a service center, and an originated address (hereinafter denoted as TP_OA). TP User Data is consisted of User Data Header Length, User Data Header comprising several Information Elements (IE), and Short Message. A concatenated EMS has one more IE than a conventional message with only one page. Generally, this additional IE is arranged as a first IE. Information stored in the first Information Element includes IE Identifier, IE Data Length and IE Data. Among these fields, IE Identifier is used to represent the concatenated information of the message. For example, if IE Identifier is 0x00 for 8 bit reference number, or 0x08 for 16 bit reference number, the corresponding message is concatenated. Normally, IE Data Length=0x03 and IE Data consists of 3 octets of Message Reference, Total Number of Pages (i.e. TPDU), and Page Number. All the TPDUs in the same EMS have the same message reference and originated address. Individual TPDUs in an EMS can be distinguished with their page numbers. For example, an EMS can be represented by a sequence of m1, m2, m3 and m4 in which m is a key word representing the EMS, the numbers 1–4 represent page numbers of its TPDU members, and thus m1–m4 can be used to represent the respective TPDUs in the EMS.

In the present invention, different EMSs in an input message sequence are distinguished with the message references and originated addresses of the individual TPDUs. The TPDUs with the same message references and originated addresses will be considered belonging to the same EMS.

In the present invention, each TPDU is assigned a status variable. For a new EMS, the status variables of its TPDUs are set into UNREAD and the new EMS is classified to an UNREAD group. Once the new EMS has been read, the status variables of all the TPDU members will be updated into READ and the EMS is classified to a READ group. If the received EMS is a broken one and a missing page arrives later, not only the status variable of the missing page is set into UNREAD but also the status variables of the previous read page of the EMS are updated into UNREAD. The resulting EMS is re-classified to the UNREAD group.

Figure 1A:
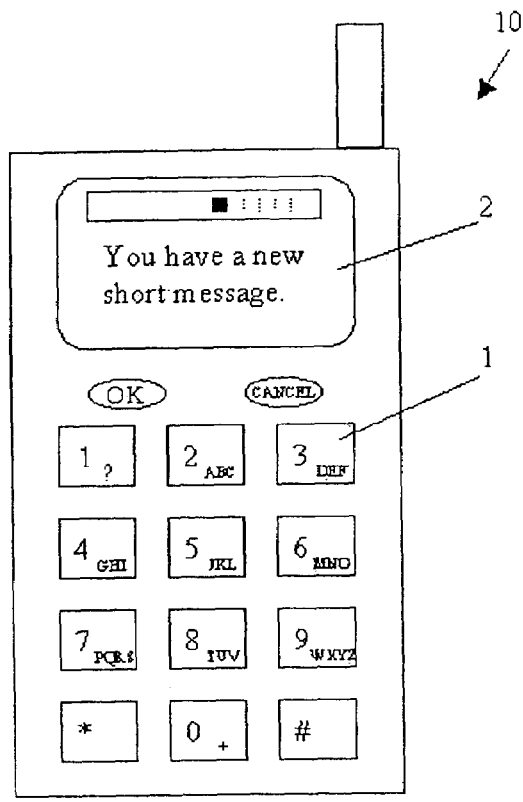
FIGS. 1A–1D are schematic diagrams of a mobile phone showing examples of 4 display modes according to the present invention, respectively.
Figure 1C:
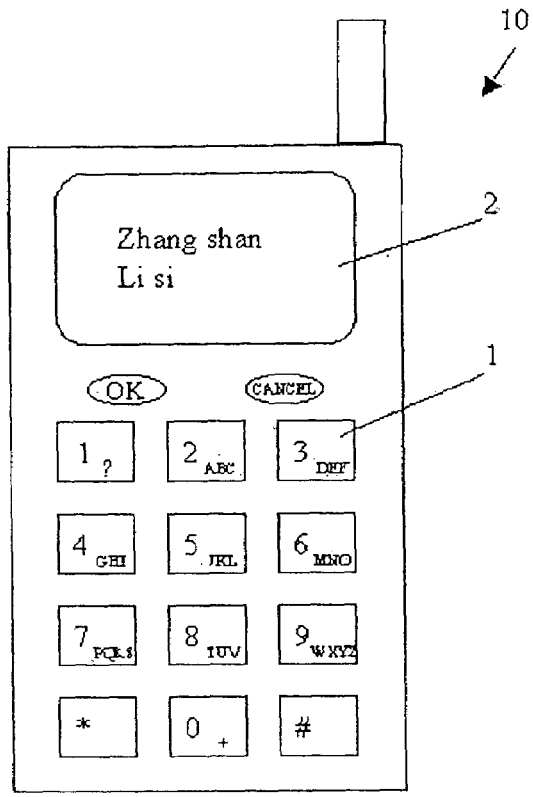
Figure 1B:
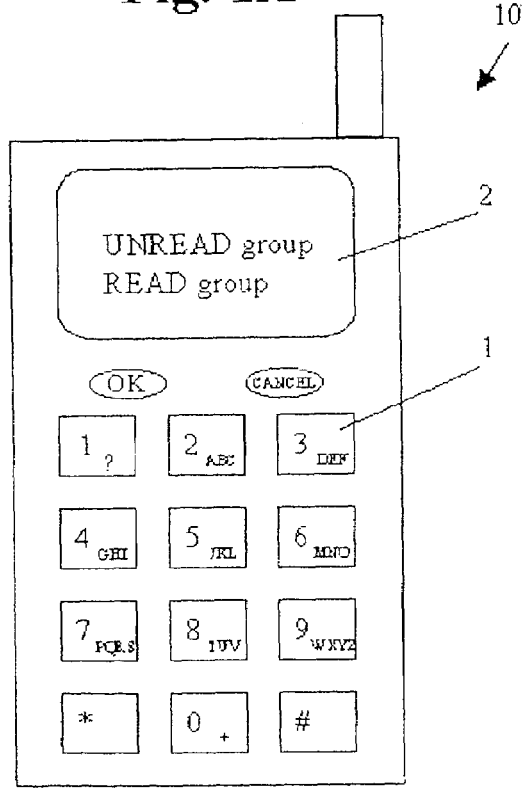

In the present invention, users are preferably informed of arrival of a message in two ways. FIG. 1A schematically illustrates an example of a display mode in this operating stage. When a first or last page of an EMS arrives at the terminal, an alert will be sounded and a temporary screen is popped up, displaying information such as "You have a new short message". In this case, the user may read the content of the EMS by simply pressing an entry key no matter whether the first or last page arrives along with other pages of the EMS at initial time or arrives as a missing page at later time. Here, the first page is the page having page number "1", and the last page is the page with the highest page number of the message. Another way is to lighten a predetermined prompt icon each time a page arrives. In FIG. 1A, the icon is arranged in a bar at the top of the screen. In this case, the user may activate a user menu and selects an entry for short messages from the menu. Then, two items will be displayed on the screen, one for UNREAD group and the other for READ group. FIG. 1B schematically illustrates an example of a display mode in this operating stage. By selecting the item of UNREAD group, some entries, such as telephone numbers or names, will be listed on the screen, in which all the EMSs corresponding to these entries have UNREAD statuses. FIG. 1C schematically illustrates an example of a display mode in this operating stage. By further designating a desired entry, the user may read the content of the corresponding EMS on the screen. When one or more pages of the message are read, the status variables of all the received pages of the message will be updated into READ and the predetermined prompt icon is darken. In the present invention, even though the predetermined prompt icon is not lightened, the user may activate the user menu on his own initiative, select the READ group, and then designate a desired entry to review the content of the corresponding EMS.

In a preferred embodiment of the present invention, the entries as shown in FIG. 1C may be listed in a predetermined order according to time parameters of the EMSs. As mentioned above, each TPDU has a TP_SCTS in TP Header, indicating the time when the TPDU arrives at a service center. Individual TPDUs may have different TP_SCTSs even if they belong to the same EMS. To sort the EMSs, the TP_SCTS of a page having the minimum page number is selected from all the received pages of the same EMS as a time parameter for the EMS. By comparing such time parameters among the EMSs in the same group (UNREAD group or READ group), the corresponding entries can be listed in an increasing or decreasing order as desired.

Figure 1D:
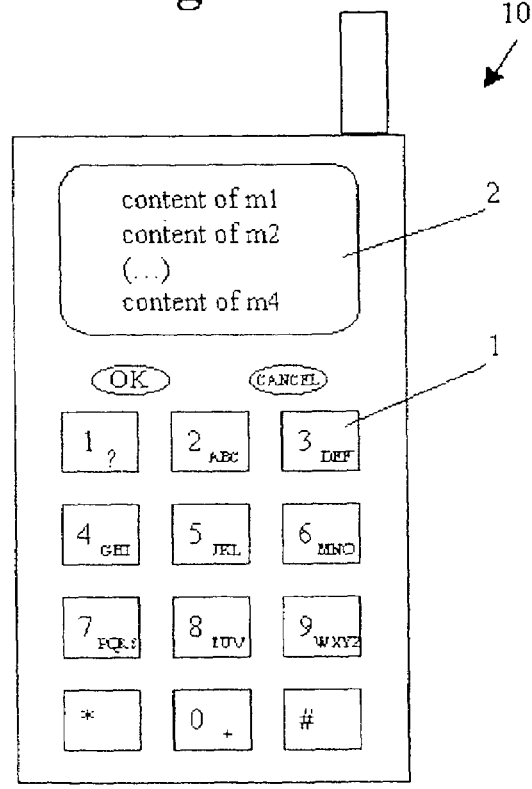

In a particular embodiment of the present invention, content of an EMS is displayed in an increasing order according to the page numbers of its TPDU members. If one or more TPDU is missing, the corresponding content is preferably replaced by displaying a special string such as "( . . . )" or a special symbol. FIG. 1D schematically illustrates an example of such a display mode. This display mode is advantageous due to its consistency with people's reading custom and the ability of indication of the missing page.

In an embodiment of the present invention, when an originator of an EMS sets a "status report" flag in the GSM REC and requests a message status report to realize whether or not the message has been properly received, the destination mobile is designed to request the recipient network to generate a status report only for the last page of the message. When the pages of the message are arranged in an increasing order, the last page is the one, which has the highest page number. The status report generated by the recipient network for the last page is considered as a status report for the entire message by the message originating mobile phone.

Figure 3:
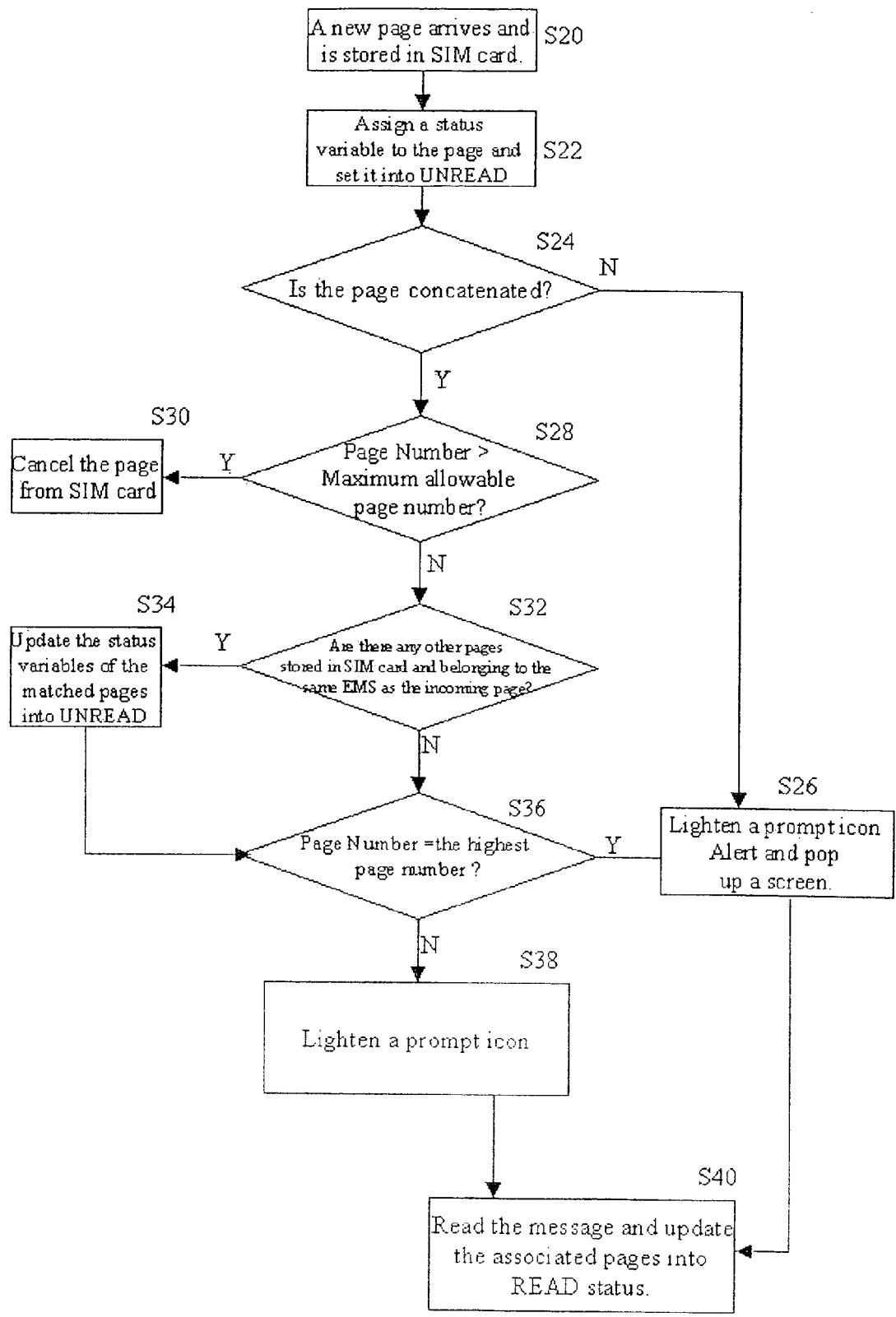
FIG. 3 is a flow chart of a process for managing an incoming EMS according to the present invention.

FIG. 3 is a flow chart of a process for managing an incoming EMS according to the present invention. The process begins with Step S20. In Step 20, a new EMS page (i.e. TPDU) arrives at a mobile phone and is stored in a SIM card. In Step S22, a status variable is assigned to the page and set into UNREAD. Then, the process goes to Step S24, judging whether the page is concatenated or not based on IE identifier of the TPDU. If it is not concatenated, that means, the incoming message only contains one page, then the process goes to Step S26. In Step S26, an alert is sounded, a temporary screen is popped up, and a prompt icon is lightened for notifying the user of arrival of the message. If the incoming page is concatenated, then Step S28 compares its page number with the maximum page number available for the mobile phone. If the page number is larger than the maximum allowable page number, then the content of the page is canceled from the SIM cord and the network is informed of receipt of the page in Step S30. If not, Step S32 further judges whether there are any other pages which are stored in the SIM card and belong to the same EMS as the incoming page based on the message references and TP_OAs of the TPDUs. If no such pages are found, the process goes to Step S36. If some pages are matched, the status variables of these matched pages are updated into UNREAD in Step S34 and then the process goes to Step S36. In Step S36, the process judges whether the page number of the incoming page is the highest page number. If it is the last page, the process goes to Step S26, alerting, displaying a piece of information, and lightening a prompt icon. If it is not the last page, a predetermined prompt icon is lighted on the screen in Step S38. When the user has read the short message in Step 40, all the associated pages are updated into READ status, and the lightened prompt icon is darkened.

Figure 4:
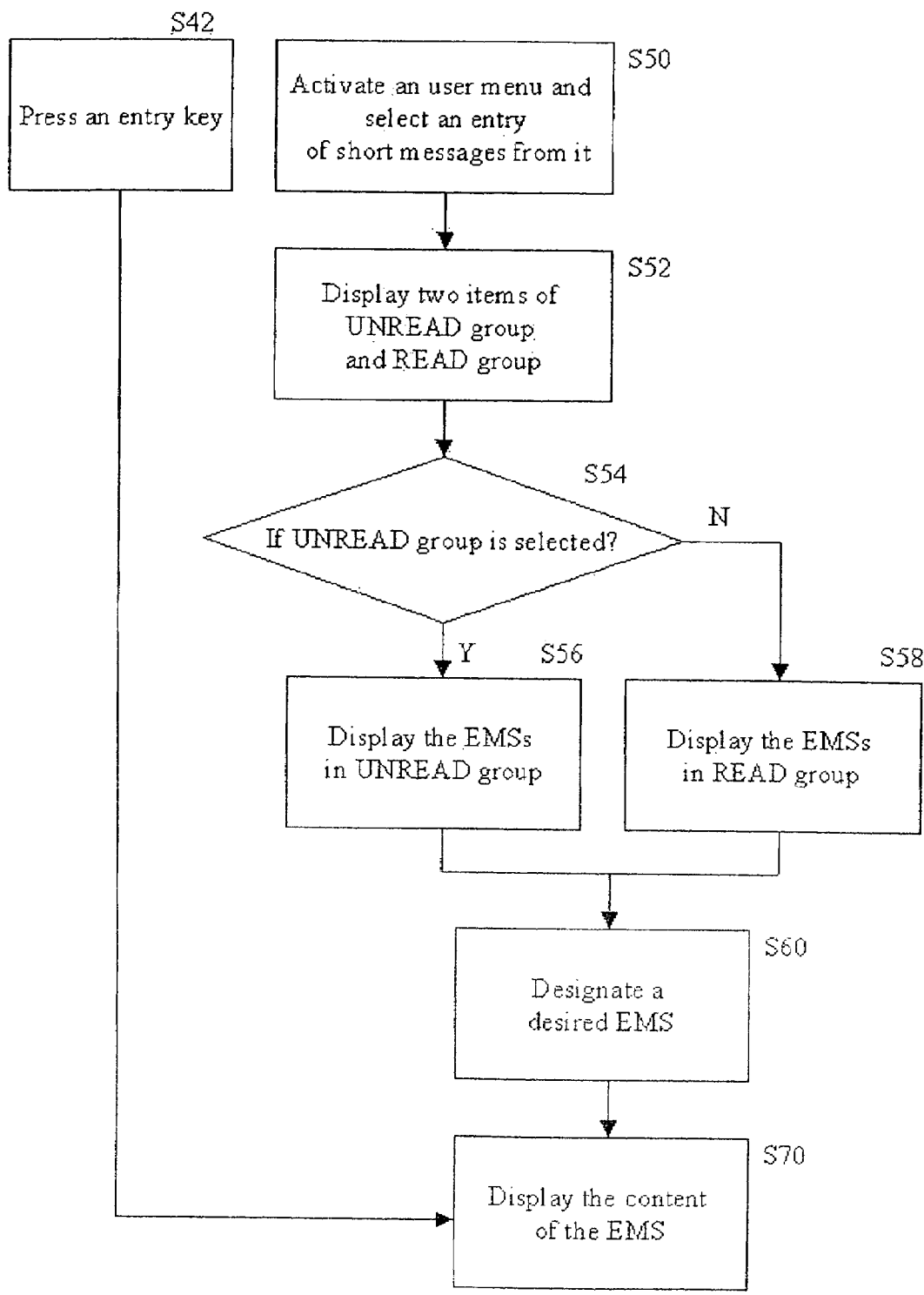
FIG. 4 is a flow chart of a process for displaying an EMS according to the present invention.

FIG. 4 is a flow chart of a process for reading an EMS according to the present invention. When information such as "You have a new short message" is displayed on the screen, the user may presses an entry key in Step S42. Then, the process goes to Step S70 to reading the content of the new message. Otherwise, the user may activate a user menu to select an entry of short messages from the menu. Then, two items of UNREAD group and READ group are displayed on the screen in Step S52. After designating between the two items, the process judges whether the item of UNREAD group is selected in Step S54. If UNREAD group is selected, the process goes to Step S56; otherwise the process goes to Step S58. In Step S56, the EMSs with UNREAD statuses are listed in an increasing or decreasing order according to their time parameters. In Step S58, the EMSs with READ statuses are listed in the same way of Step S56. In Step S60, the user designates a desired EMS from those listed. Then, the process goes to Step S70 to display the content of the designated message.

Figure 5:
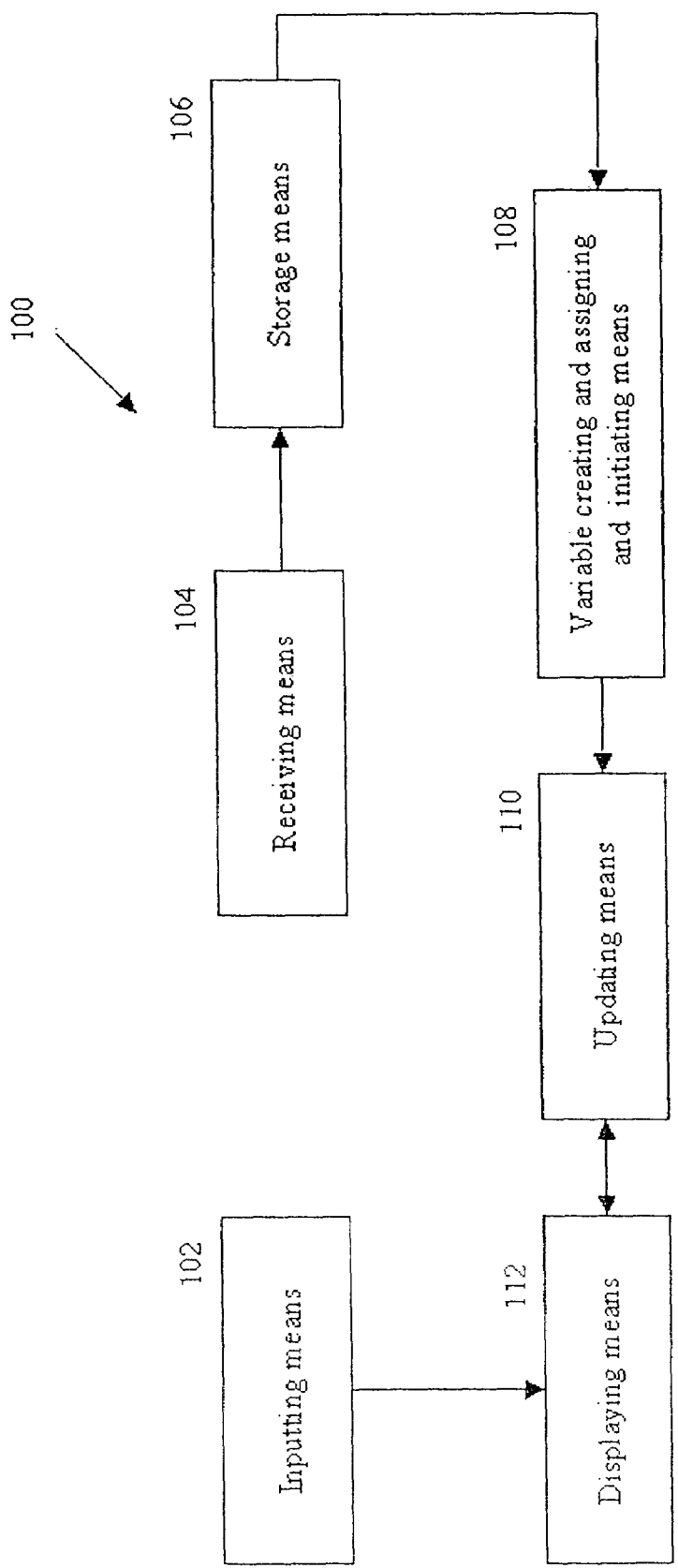
FIG. 5 is a block diagram of a telecommunication terminal according to the present invention.

FIG. 5 is a block diagram of an example of a telecommunication terminal according to the present invention. The telecommunication terminal 100 comprises an inputting means 102, a receiving means 104, a storage means 106, a variable creating and assigning and initiating means 108, a updating means 110, and a displaying means 112. A new message page is received by the receiving means 104 and stored in the storage means 106. The variable creating and assigning and initiating means 108 creates a status variable representing the READ/UNREAD status of a page, assigns each newly arrived page said status variable and initiates the variable as UNREAD status. The updating means 110 changes into UNREAD the status variables of all the other pages which have already been stored in the storage means and belong to the same message as the new page. Information of arrival of the new page is displayed on the displaying means 112. Then the use may input his instructions with the inputting means 102 such as a keyboard and read the message. When a message is read, the updating means 110 changes all the pages of the read message into READ.

The following is an example. A message sequence is input in the order of m4, m1, M3, m2, M4, M2. This message sequence comprises two EMSs. The first EMS is represented by a key word m and consisted of 4 pages in which m1, m2, and m4 are respectively the first, the second and the fourth ones of the EMS. The second EMS is represented by a key word M and consisted of 5 pages in which M2, M3 and M4 are respectively the second, the third and the fourth ones of the EMS. At that time, both the two messages are arranged in the UNREAD group.

As the last page of the message m arrives, a temporary screen is popped up, displaying "You have a new short message". If the user entries, the content of the message will be displayed as shown FIG. 1C. And, the status of m1, m2 and m4 are updated into READ and the message m is re-classified into the READ group. The message M is still in the UNREAD group.

From then on, the user may find the message m in the READ Group.

If a page m3 arrives later, the pages of m1, m2 and m4 will be updated back to UNREAD statuses and the message m returns to the UNREAD group.

Summing up the above, a status updating method, a notifying method, a compound grouping and sorting method, and a substituted string inserting method are used in the present invention. More specifically, in the status updating method, a status variable is assigned to each received EMS page. All pages of an EMS change their status variables consistently between READ and UNREAD. A new input EMS page will results in the changing of other pages stored in SIM card and belonging to the same EMS as the new page from READ status into UNREAD status. The notifying method can be implemented in two ways. When a first or last page of an EMS arrives, an alert will be sounded and a temporary screen is popped up, displaying information such as "You have a new short message". When any page arrives, a prompt icon will be activated. The compound grouping and sorting method is used for display modes of the present invention. In this method, the EMSs with their pages in UNREAD statuses are classified into an UNREAD group while those EMSs with their pages in READ statuses are classified into a READ group. In each group, EMSs are sorted in an increasing or decreasing order according to their representative TP_SCTSs. Each EMS corresponds to a series of the pages with the same message reference and TP_OA. Furthermore, each EMS is displayed in ascent order according to page numbers, in which a missing page is replaced by a special string or symbol.

In the present invention, each EMS can be viewed at any time no matter whether it has been read or unread and whether it is broken or unbroken, except that the whole EMS has been cancelled. The user may directly read an EMS when a temporary screen is activated, or find a desired EMS from the UNREAD group or the READ group. Content of an EMS is displayed in a friendly way. It consists with people's reading custom and is able to indicate missing pages. Similar to a browser downloading process, a user may read a concatenated EMS little by little, page by page in the present invention, without requiring arrival of all the pages of the EMS.

It will be apparent to those skilled in the art that various modifications and variations can be made to the present invention without departing from the spirit or scope of the invention. Thus, it is intended that the present invention covers the modifications and variations provided they come within the scope of the appended claims and their equivalents.

What is claimed is:

1. A method for managing a concatenated Enhanced Short Message sent by a telecommunication network to a telecommunication terminal, in which the message comprises at least one page, characterized in that said method comprises the steps of:

a) creating a status variable representing the READ/UNREAD status of a page;

b) assigning said status variable to each page received by the telecommunication terminal;

c) initiating said assigned status variable into UNREAD; and d) updating the status variables of all received pages in the message into READ after any one of the received pages of the messages has been read, and updating the status variables of all the previously received pages of the message into UNREAD when a posterior page of the message is received.

2. A method according to claim 1, wherein the message has only one page, and further comprising the step of alerting and popping up a screen to display a piece of information when said page is received.

3. A method according to claim 1, wherein the message comprises at least two pages, each page comprising fields for representing the total number of the EMS pages and its page number.

4. A method according to claim 3 further comprising the step of setting a predetermined icon into a prompt state each time when a page is received.

5. A method according to claim 4 further comprising the step of alerting and popping up a screen to inform arrival of the message when a last page of said message is received.

6. A method according to claim 5, further comprising the steps of:

displaying the content of the message on the screen when a displaying instruction is received; and updating the status variables of all the received pages of the message into READ.

7. A method according to claim 4, further comprising the steps of:

activating a user menu;

selecting an entry of short messages from the user menu and displaying on the screen two items of UNREAD group and READ group, the UNREAD group including messages having their pages in UNREAD statuses and the READ group including messages having their pages in READ statuses;

designating the UNREAD group and listing the messages in the UNREAD group on the screen;

designating a desired message and displaying its content on the screen;

updating the status variables of all the pages of the message into READ; and setting said predetermined icon into a counter-prompt state.

8. A method according to claim 6, further comprising the steps of:

activating a user menu;

selecting an entry for short messages from the user menu and displaying two items of UNREAD group and READ group on the screen, the UNREAD group including messages having their pages in UNREAD statuses and the READ group including messages having their pages in READ statuses;

designating the READ group and listing the messages in the READ group on the screen; and designating a desired message and displaying its content on the screen.

9. A method according to claim 7, wherein the step of listing the messages in the UNREAD group comprises the step of listing the UNREAD messages in an increasing order according to their respective time parameters.

10. A method according to claim 7, wherein the step of listing the messages in the UNREAD group comprises the step of listing the UNREAD messages in a decreasing order according to their respective time parameters.

11. A method according to claim 8, wherein the step of listing the messages in the UNREAD group comprises the step of listing the UNREAD messages in an increasing order according to their respective time parameters, and the step of listing the messages in the READ group comprises the step of listing the READ messages in an increasing order according to their respective time parameters.

12. A method according to claim 8, wherein the step of listing the messages in the UNREAD group comprises the step of listing the UNREAD messages in a decreasing order according to their respective time parameters, and the step of listing the messages in the READ group comprises the step of listing the READ messages in a decreasing order according to their respective time parameters.

13. A method according to claim 9, wherein the time parameter of one message is represented by a field of TP_SCTS in a page of said message, in which said page has the minimum page number among all the received pages of the message.

14. A method according to claim 6, wherein the step of displaying the content of the message comprises the step of displaying the content of the message in an increasing order of the page numbers.

15. A method according to claim 14, wherein the step of displaying the content of the message comprises the step of displaying a predetermined symbol or string to replace a missing page.

16. A method according to claim 3, wherein the step of updating the status variables of all the previously received pages of the message into UNREAD when a posterior page of the message is received comprises the step of comparing said posterior page with all the pages received by the telecommunication terminal with respect to their fields of message references and originated addresses to identify the component pages belonging to the same message as said posterior page.

17. A method according to claim 3 further comprising the steps of judging whether the page number of the received page is larger than the maximum page number available for the terminal; and informing the network of receipt of the page and canceling the page when the page number is larger than the maximum available one.

18. A method according to claim 3 further comprising the step of requesting a recipient work to send a status report for the last page to a message originating terminal indicating that the message has been properly received.

19. A telecommunication terminal for managing a concatenated Enhanced Short Message sent by a telecommunication network, said message comprising at least one page, said telecommunication terminal comprising:
    means for inputting instructions;
    means for receiving a page;
    means for storing the received page;
    means for informing the user of arrival of the page:
    characterized in that said telecommunication terminal further comprises:
    means for creating a status variable representing the READ/UNREAD status of a page;
    means for assigning said status variable to each page received by the telecommunication terminal;
    means for initiating said status variable into UNREAD; and
    means for updating the status variables of all received pages in the message into READ after any one of the received pages of the messages has been read and updating the status variables of all the previously received pages of the message into UNREAD when a posterior page of the message is received.

20. A telecommunication terminal according to claim 19, wherein said telecommunication terminal is a mobile phone.

21. A telecommunication terminal according to claim 20, wherein said storing means is a SIM card.

22. A telecommunication terminal according to claim 20 further comprising means for requesting a recipient work to send a status report for the last page to a message-originating terminal indicating that the message has been properly delivered.

* * * * *